Figures 1, 2:
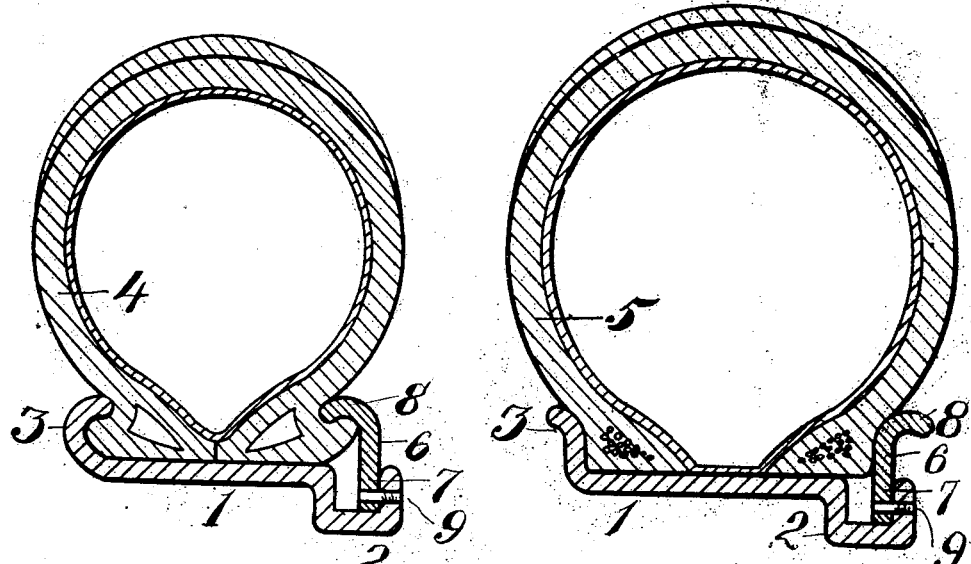

No. 814,087. PATENTED MAR. 6, 1906.
F. A. SEIBERLING.
VEHICLE WHEEL.
APPLICATION FILED MAR. 2, 1905.

Witnesses
a. E. King
Herrara Fox

Inventor,
F. A. Seiberling
by C. E. Humphrey
Atty.

UNITED STATES PATENT OFFICE.

FRANK A. SEIBERLING, OF AKRON, OHIO.

VEHICLE-WHEEL.

No. 814,087.

Specification of Letters Patent.

Patented March 6, 1906.

Application filed March 2, 1905. Serial No. 348,126.

*To all whom it may concern:*

Be it known that I, FRANK AUGUSTUS SEIBERLING, a citizen of the United States, residing at Akron, in the county of Summit and State of Ohio, have invented new and useful Improvements in Vehicle-Wheels, of which the following is a specification.

This invention relates to vehicle-wheels provided with pneumatic, solid, or cushion tires, of elastic material, more particularly pneumatic tires of the double-tube type having contractible, inextensible, or semi-inextensible bands or edges; and the object thereof is to so construct the wheel as to enable the tire to be very quickly applied or removed when necessary.

The invention further aims to provide a wheel of the class referred to with a new and improved holdfast means for the tire, hereinafter more specifically described, said means fixedly securing the tire in position, so that the tire will not be displaced in any manner, and said means being removable as well as reversible to enable its use in connection with tires of various constructions.

The invention further aims to provide a vehicle-wheel of the class referred to with a rim, hereinafter more specifically described, said rim coöperating with a new and improved holdfast means for the tire, said rim and means being simple in construction, strong, durable, efficient in use, comparatively inexpensive to manufacture, readily applied to ordinary forms of wooden-felied wheels or those using metal spokes, and enables a tire to be readily secured or removed when occasion requires.

The invention further aims to provide means for fixedly securing the holdfast means of the tire in such operative relation to the rim as to prevent its becoming accidentally displaced at any time and to accomplish this function by utilizing the inflation of the tire as a locking agent, so that the tire deflated may be seated upon the rim and by its subsequent inflation secure the holdfast means against removal, and after this the holdfast means can only be removed by deflating the tire. At the same time the deflation of the tire will not without other assistance cause the removal of the holdfast means from its seat.

With the foregoing and other objects in view the invention consists of the novel construction, combination, and arrangement of parts constituting the wheel, to be hereinafter referred to, and illustrated in the accompanying drawings, which form a part of this specification, in which is shown the preferred embodiment of the invention; but it is to be understood that changes, variations, and modifications can be resorted to which come within the scope of the claims hereunto appended.

Figure 3:
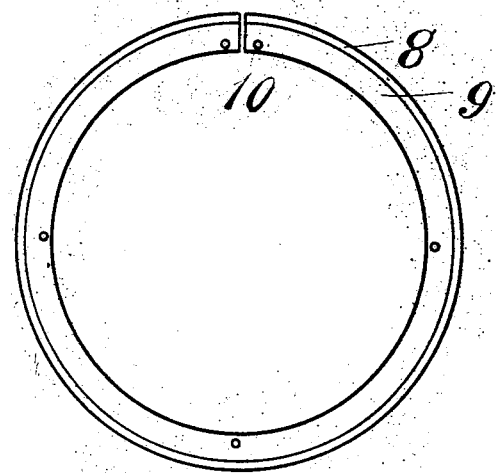
Figure 4:
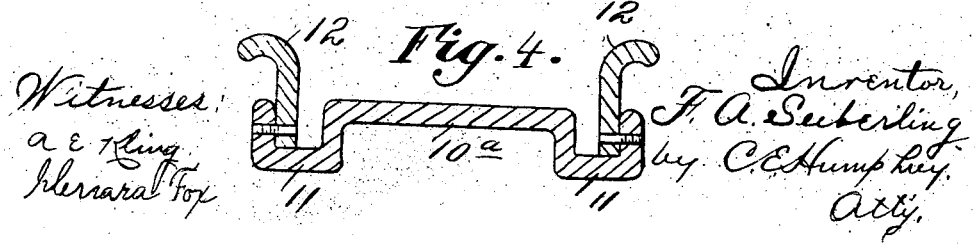

In the drawings, wherein like reference characters denote corresponding parts throughout the several views, Figure 1 is a cross-section of a rim and tire portion of a wheel constructed in accordance with this invention, also showing a section of the holdfast means for securing the tire, said holdfast means arranged in operative relation with respect to that form of tire known as the "clencher" type. Fig. 2 is a like view showing the arrangement of the holdfast means in operative relation with respect to another form of tire. Fig. 3 is a side elevation of the holdfast means detached, and Fig. 4 is a transverse section illustrating the reversibility of the tire-holding flange.

Referring to Figs. 1 and 2 of the drawings, 1 denotes a flat rim having one side formed with an endless offset 2 of approximately the shape shown in the drawings in cross-section and forming a seat for the purpose hereinafter set forth. Said offset 2 is on the level or depends below the plane of the inner face of the rim. The other side of the rim 1 is formed with an upwardly-extending endless flange 3, forming an abutment and tire-retaining device for the purpose hereinafter set forth, or it may be provided with a seat similar to the offset 2, or any other preferred or desired means may be employed which will hold or retain that side of the tire which is to seat on the rim securely in place. By way of example, one form is shown in Fig. 4, in which 10ª denotes the tire, having an offset 11 at each side thereof, each of the offsets forming a seat, and 12 denotes the tire-retaining devices mounted in the seats formed by the offsets. The tire-retaining devices 12 and the offsets 11 are substantially of the same construction as that shown in the other figures of the drawings. In the form shown in Fig. 1 the flange constitutes an upwardly-inclined hook-shaped member, and in the form shown in Fig. 2 it consists of an approximately upwardly and outwardly extending rim, the difference in shape of these two flanges being due to the fact that they are to be used in connection with different types of tires.

The holdfast means for the tire, whether it be used for the form of tire shown in Fig. 1, which is indicated by the reference character 4, or whether it be used for the form of tire shown in Fig. 2, which is indicated by the reference character 5, consists of a split ring 6, having its inner portion (indicated by the reference-numeral 7) approximately flat and with its outer portion (indicated by the reference character 8) bent to one side in a hook shape. This ring, constituting a holdfast means for the tire, is arranged to be sprung into position by passing over the outer portion of the offset 2 and arranged to seat in the groove formed therein. In order to retain the split ring 6 against detachment, there are placed or located in the offset 2 or 11 a series of pins or studs 9, arranged to project into the groove of the offset such a distance as to enter openings 10, which are formed through the base or inner portion 7 of the ring 6.

In assembling a wheel for use in connection with the tire 4 in Fig. 1 the tire deflated is placed upon the rim 1 with one of its edges in operative relation with the clencher-flange 3 and the ring 6 sprung into the groove in the offset 2, and it will here be stated that the width of this groove is sufficient to permit the effectual seating of the ring 6 in said groove when said tire is deflated without an initial engagement with the pins 9. The ring 6 is then moved outwardly from the flat portion of the rim 1 sufficiently to cause the coöperation of the pins 9 with the openings 10, which effectually prevents the withdrawal of the ring 6 or any motion thereof. The inflation of the tire constantly tends to keep the openings 10 of the ring 6 in engagement with the pins 9 at all times, thereby locking the holdfast means for the tire in position. In setting up a tire of the form shown in Fig. 2 the holdfast means is reversed, so as to present the rounded portion 8 of the ring 6 to the tire, the curve of which is approximately equal to the curve of the integral flange 3, and the same operation is repeated as has just been described with reference to the assembling of the tire in Fig. 1.

Having thus described my invention, what I claim, and desire to secure by Letters Patent, is—

1. A vehicle-wheel comprising the combination with a rim and a tire mounted thereon, said rim having an offset along one side, a spring-tire-holding element mounted in said offset and capable of lateral movement therein, and means to lock said tire-holding element against circumferential motion when in one position in said offset, said tire-holding element being free from engagement with said locking means when in a different position in said offset.

2. A vehicle-wheel comprising the combination with a rim and a tire mounted thereon, said rim having an offset along one side, a reversible spring-tire-holding element mounted in said offset and capable of lateral movement therein, and means to lock said tire-holding element against circumferential motion when in one position in said offset, said tire-holding element being free from engagement with said locking means when in a different position in said offset.

In testimony whereof I have hereunto set my hand in presence of two subscribing witnesses.

FRANK A. SEIBERLING.

Witnesses:
C. E. HUMPHREY,
GLENARA FOX.